United States Patent [19]

Patterson

[11] 4,307,984
[45] Dec. 29, 1981

[54] CUTTING ELEMENTS

[76] Inventor: James A. Patterson, 1295 S. Springer Rd., Los Altos, Calif. 94022

[21] Appl. No.: 95,569

[22] Filed: Nov. 19, 1979

[51] Int. Cl.³ .............................................. B23B 27/20
[52] U.S. Cl. .................................... 408/145; 33/21 D; 33/28; 76/101 R; 76/108 R; 83/915.5; 125/39; 407/118
[58] Field of Search ........................ 408/144, 145, 199; 407/118; 125/39; 76/DIG. 12, 108 R, 101 R; 228/122; 83/915.5; 33/21 D, 28

[56] References Cited

U.S. PATENT DOCUMENTS

| | | | |
|---|---|---|---|
| 1,299,619 | 4/1919 | Rose | 76/DIG. 12 |
| 1,524,218 | 1/1925 | Smith et al. | 76/DIG. 12 |
| 1,926,330 | 9/1933 | Cotton | 76/DIG. 12 |
| 2,961,750 | 11/1960 | Bender | 76/DIG. 12 |
| 3,192,620 | 7/1965 | Huizing et al. | 228/122 |
| 3,678,568 | 7/1972 | Knippenberg et al. | 228/122 |
| 3,868,750 | 3/1975 | Ellis et al. | 125/39 |

FOREIGN PATENT DOCUMENTS 743343  1/1956  United Kingdom ................. 125/39

*Primary Examiner*—Leonidas Vlachos
*Attorney, Agent, or Firm*—Limbach, Limbach & Sutton

[57] ABSTRACT

A novel shock mounting is disclosed for ultra-hard crystalline materials. When used as a drill bit, the crystalline materials last much longer as cutting elements when mounted according to the present invention.

15 Claims, 4 Drawing Figures

U.S. Patent  Dec. 29, 1981  4,307,984
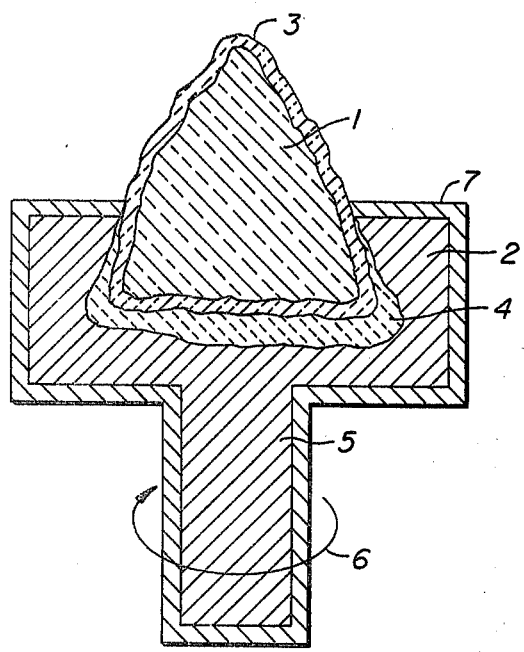
FIG.__1.
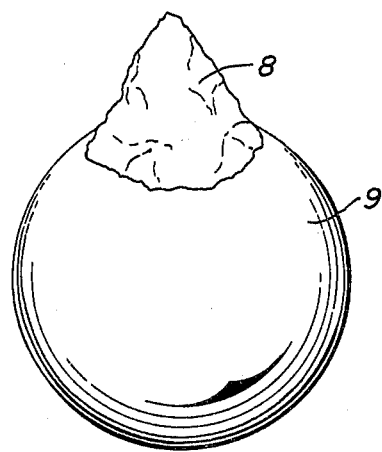
FIG.__2.
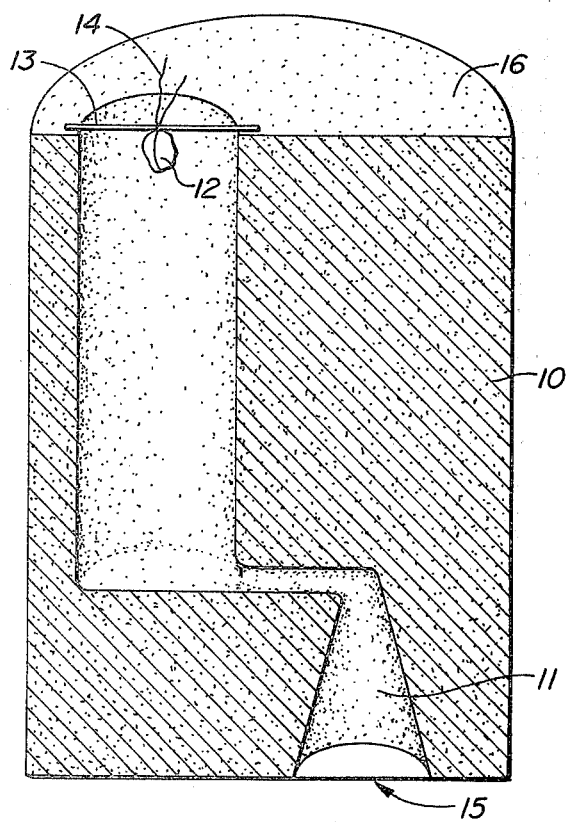
FIG.__3.
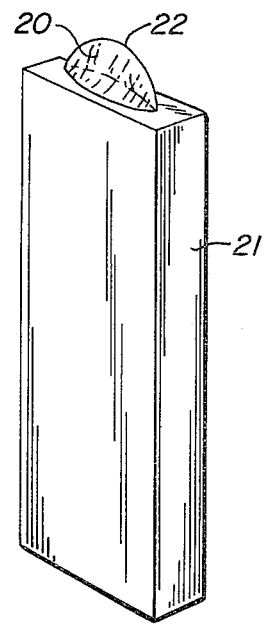
FIG.__4.

CUTTING ELEMENTS

BACKGROUND OF THE INVENTION

In the past, industrial diamond and other hard materials such as cubic zirconium or carborundum have been used in various cutting operations where extreme hardness is required. Although such materials represent excellent surfaces for cutting or abrading, certain problems in durability have been encountered due primarily to thermal shock and cracking because of compressional forces.

Applicant has recognized that the parameters which control the durability of the cutting edges of ultra-hard crystalline materials can be modified and controlled by varying the mounting structures used to retain these crystalline materials in their cutting positions. Prior to applicant's invention, the cutting elements were held in place by one of two means. The first entailed the mere crimping of metal prongs about the crystalline surface. The second comprised the brazing of the crystalline materials in a stainless steel mounting.

Unfortunately, both standard prior art mounting techniques provided little to aid in the durability of the crystalline cutting surface. In each case, there was nothing to dissipate the tremendous shear and compressional forces which the cutting element is designed to encounter. Furthermore, the cutting element can suffer from thermal shock as neither mounting systems could be characterized as good thermal conductors. During grinding operations, the crystalline elements experience very high thermal conditions due to the frictional contact between the cutting surface and the material to be cut or ground.

When used as a drill bit, once the crystal was mounted, the orientation of the cutting surface would remain constant and fixed over the life of the drill bit itself. The present invention has also recognized the desirability for being able to design a mounting which would allow for a change in orientation so that as the cutting surface becomes worn in one plane, it can be rotated to display a second plane as the cutting surface.

Diamond, zirconium and carborundum (sapphire or ruby) cutting elements, for example, have also been used in making microtome knife blades. The blades, presenting an ultra-hard and ultra-sharp surface, have been used by the medical profession in performing biopsies where very thin layers of tissue must be cut accurately in the performance of pathological tests. Prior to the present invention, microtome blades were prepared by cutting a diamond or cubic zirconium stone along the major axis forming a knife blade. The stone was then mounted, resulting in misalignment of the blade axis to the microtome knife blade body. By employing the mounting of the present invention, alignment of the blade to the mounting is insured.

Similarly, these crystalline materials have been used to produce scribing tools, useful in scoring such things as semiconductor wafers. Prior art scribing tools have been made by sharpening crystalline bodies to a sharp point before mounting in an appropriate holder which resulted in misalignment of the scribe point to the holder body.

SUMMARY OF THE INVENTION

It is an object of the present invention to provide mountings for ultra-hard crystalline materials without displaying the disadvantages of the mountings of the prior art.

It is yet another object of the present invention to provide mountings for ultra-hard crystalline materials which substantially reduce damage to the cutting surface due to compressional or shear forces.

It is still another object of the present invention to provide mountings for ultra-hard crystalline materials which are capable of dissipating heat build-up on the cutting surface to minimize damage due to thermal shock.

It is still another object of the present invention to provide mountings for a microtome cutting blade and scribe wherein the holder and major axis of the cutting element are in insured alignment.

The present invention can be best illustrated in describing the fabrication of two basic cutting elements. The first being a drill and the second, a microtome knife blade. The present invention can be further illustrated when viewing the following drawings wherein:

FIG. 1 is a cross-section of a drill bit prepared according to the present invention;

FIG. 2 is another drill bit produced according to the present invention;

FIG. 3 is a mold which is used to fabricate a mounting according to the present invention; and FIG. 4 is a microtome knife blade prepared using the mold of FIG. 3.

DRILL BIT FABRICATION

As previously stated, ultra-hard crystalline drill bits suffer a shortened life span because of compressional and shear forces and thermal shock, which are encountered during normal drilling operations. The present invention overcomes these wear inducing phenomena in several ways. Firstly, the crystalline material such as diamond, cubic zirconium and carborundum (sapphire or ruby) is placed in metal mounting which is, itself, a good thermal conductor and which is resistant to thermal oxidation. It has been found that silver, platinum, gold, tungsten and rhodium provide an excellent support body with silver being the most preferred material due to its relatively low cost and high resistance to oxidation. In FIG. 1, the mounting is shown as element 2.

In addition to minimizing thermal shock by using a mounting of a highly thermal conductive material, it may also prove beneficial to coat the crystalline material 1 with a material which would allow its surface to be "wet". Typically, ultra-hard crystalline materials are naturally hydrophobic and thus cannot be wet by aqueous media. This is particularly desirable in ground drilling operations where subterranean water can be used as a natural cooling source for the crystalline cutting element. It has been found that a silica glaze can be coated and baked on the surface of the crystal which would cause it to become hydrophilic. A suitable such high temperature glaze is available from Duncan Ceramic Products and is sold under the trade name "GL 611 Ultra-Clear". The crystal is painted with this material and fired in a kiln at between approximately 1800° F. to 2300° F. for approximately eight hours. The resultant coating, shown as layer 3 in FIG. 1, tenaciously bonds to the surface of the cutting element and renders the same hydrophilic. The silica glaze also renders the crystal easier to handle. These materials are quite slippery in their natural state and the use of the silica glaze increases the coefficient of friction on the surface of the stone, which greatly facilitates their handling in the mounting operation.

Shear forces represent a major problem in maintaining longevity in the cutting elements. Although these materials are very hard, they are also brittle and capable of fracturing. To cushion the cutting element against compressive forces, a second layer of ordinary ceramic clay can be placed beneath cutting element 1 shown as area 4 in FIG. 1. Various clays which can be employed in the present invention are disclosed in "Clay and Glazes for the Potter" by Daniel Rhodes, Chilton Book Co., pp. 124-204 (1974). The clay can be hardened in situ resulting in a fracturable subsurface which substantially reduces fracturing of the crystal due to compressive forces.

The structure shown in FIG. 1 is intended to be used as a drill bit. As such, contact is often made not only between the cutting element 1 and the surface to be cut, but also between the latter and the actual mounting body 2. As a preferred embodiment in practicing the present invention, mounting body 2 is coated with rhodium, which protects the comparatively soft metallic mounting body with a layer of relatively hard rhodium, which is shown in FIG. 1 as layer 7. The rhodium also acts to reduce the coefficient of friction of the mounting body and thus provides for a more effective drill bit. When the coefficient of friction is reduced upon the drill bit mounting, the drill can be made longer for the frictional torque moment is smaller.

Rhodium layer 7 can be coated upon mounting body 2 by electroplating. The mounting body is used as the cathode while the anode is platinum. Vigor Corporation produces an electrolyte for rhodium plating which is used at a temperature between approximately 85° F.-110° F. at 4 volts for 30 seconds. When silver is used as the mounting body, it is preferable to coat a layer of gold upon it before applying the rhodium. The gold can also be electroplated upon the silver body.

As the drill bit illustrated in FIG. 1 is used in an actual drilling operation, a single face of the crystal is abraded against the object to be drilled. In order to extend the life of the cutting element, the bit is made to rotate about its longitudinal axis as shown figuratively by arrow 6. Thus, an operator can loosen the drill bit mounting and turn the mounting body as shown in order to present a fresh face to the workpiece.

As an alternative embodiment to the drill bit shown in FIG. 1 is that shown in FIG. 2 wherein the mounting is substantially of a spherical configuration. The drill bit can be fabricated in the identical manner as disclosed with regard to the drill bit shown in FIG. 1. That is, the crystal can possess a silicate glazing and rhodium layer plated over the mounting body. The cutting element is also cushioned against compressive forces by using a clay seat between the cutting element 8 and mounting body 9.

The spherical shape drill bit as shown in FIG. 2 possesses the advantage of providing an expanded choice of cutting edges in the grinding operation. The configuration shown in FIG. 1 is capable of rotating about a single longitudinal axis which allows cutting element 1 to be periodically turned to prevent the cutting element from being worn away at only one face. The spherical structure shown in FIG. 2 is capable of rotating along all three axes and thus can present a wider range of cutting faces so that cutting element 8 can be turned and worn evenly during its life in drilling operations.

FIG. 3 illustrates the method of preparing the novel cutting elements of the present invention. As described previously, the crystalline element is first coated with a silicate glaze which is baked upon the stone surface. In order to render the coating hydrophilic, it is exposed to, for example, sodium hydroxide (NaOH) to complete this step of the process. Once this has been completed, a portion of the crystalline element is coated with a clay which is later hardened in situ once the support mounting has been formed.

The mounting body is produced by a lost wax process which can be best illustrated by viewing FIG. 3. A wax mold is made of the mounting body in which is placed the cutting element 12. It has been found that the cutting element can best be positioned and moved about when it is wrapped by tungsten wire 14. Tungsten centering rod 13 is also placed upon the cutting element when fabricating a microtome blade and scribe which will be described at a later point in this description. After the wax mold is made, a sand-cast 10 is placed about the wax and is hardened. The wax is then melted and exits the sand-cast as a liquid at 15. The sand-cast is then inverted and a vacuum is drawn at 15 while the opposite surface 16 is placed within a molten liquid bath of the metal which is to make-up the mounting body. The metal is drawn through the sand-cast and forms the mounting body structure. After this is accomplished, tungsten wires 14 and any unwanted portions of the mounting body are removed to expose cutting element 12. The mounting can then be baked to harden the clay layer and can be placed within an electrolytic bath to coat rhodium thereon.

FIG. 4 illustrates a microtome knife blade of the present invention. The mounting support body 21 is made of the same materials as discussed above. Furthermore, like the drill bit of FIG. 1, the microtome knife employs a silicate coating over cutting element 20 and a clay compressive force absorbing layer which is located between the cutting element and the support body.

Although the microtime knife blade can be made according to the lost wax process as discussed in relation to FIG. 3, there is one processing step which separates its fabrication from that of a drill bit. More specifically, it is necessary in producing a microtome knife blade to strictly align a major axis of the cutting element with the longitudinal axis of the mounting holder. If this is not done, the knife will not cut properly and its practical utility will be greatly reduced.

In the prior art, microtome knife blades were produced by cutting a crystal in a lead dopper first and then taking the already cut diamond and putting it in an acceptable holder. Unfortunately, it is very difficult to set the cutting element in exact proper alignment. As discussed below, the present invention enables the edge formation of the cutting element to be made after the crystal has been set within the mounting body. Thus, alignment is no longer a major problem.

In discussing FIG. 3, a tungsten indexing bar 13 was mentioned as being appropriate when producing a microtome knife blade. An operator would examine the cutting element to determine the location of one of its major axes. The tungsten bar 13 would then be placed across that axes and tied in place with tungsten wire 14. By properly centering the tungsten wire, the cutting element 12 can be properly centered within the wax mold. When grinding down the mounting element 21 to expose cutting element 20 and when grinding down element 20 into a sharp knife blade having edge 22, the tungsten bar acts as a guide allowing the knife edge to be located precisely at one of the stone's major axes.

Although not illustrated, the present invention also deals with the fabrication of a scribe. The scribe is prepared by manufacturing the microtome blade as previously discussed followed by merely grinding down the crystal on at least four sides rather than stopping after grinding two sides in making the microtome blade.

Although the present invention has been described in terms of a drill bit and knife blade, the present invention can be used in any environment where improved resistance to stress is desired of an ultra-hard crystalline material. Modifications in producing various other cutting elements, which are clearly within the scope of one skilled in this art, are considered to be part of the present invention.

What is claimed is:

1. A cutting element comprising:
   A. a cutting member comprising ultra-hard crystalline material;
   B. a support body comprising a highly conductive low oxidizing metal selected from the group consisting of silver, gold, platinum, tungsten and rhodium; and
   C. a cushion layer comprising a ceramic clay substantially between the ultra-hard crystalline material and the support body.

2. The cutting element of claim 1 wherein said support body is composed substantially of silver.

3. The cutting element of claim 1 wherein said ultra-hard crystalline material is substantially coated with a film which renders the cutting element hydrophilic.

4. The cutting element of claim 3 wherein said film comprises a silicate glaze.

5. The cutting element of claim 1 wherein said support body is substantially coated with an abrasion resistive layer.

6. The cutting element of claim 5 wherein said abrasion resistive layer is comprised substantially of rhodium.

7. The cutting element of claim 1 wherein said element is comprised of a member selected from the group consisting of a drill bit, knife blade and scribe.

8. The cutting element of claim 7 wherein said cutting member is a knife blade and wherein said ultra-hard crystalline material is oriented in said support body so that a major crystalline axis of said cutting element is substantially centered on one surface of said support body.

9. The cutting element of claim 7 wherein said cutting member is a drill bit and wherein said support body is of such shape as to be capable of rotating along at lease one axis within a drill bit holder.

10. The cutting element of claim 1 wherein said support body comprises a silver core with a layer of gold and an outer layer of rhodium.

11. The cutting element of claim 8 wherein the ultra-hard crystalline material is capable of being sharpened while positioned within said support body.

12. The cutting element of claim 1 wherein the ultra-hard crystalline material is selected from the group consisting of diamond, cubic zirconium and carborundum.

13. A drill bit comprising:
    A. a cutting element comprising an ultra-hard crystalline material selected from the group consisting of diamond, cubic zirconium and carborundum;
    B. a coating which renders the cutting element substantially hydrophilic being composed substantially of a silicate glaze;
    C. a support body comprised of a metal selected from the group substantially consisting of silver, gold, platinum, tungsten and rhodium;
    D. a cushion layer substantially between the hydrophilic silicate glaze and the support body comprising a ceramic clay; and
    E. an abrasion resistive layer on said support body comprised substantially of rhodium.

14. A knife blade comprising:
    A. a support body comprising a metal selected from the group substantially consisting of silver, gold, platinum, tungsten and rhodium;
    B. a cutting element comprising an ultra-hard crystalline material selected from the group consisting of diamond, cubic zirconium and carborundum placed within said support body wherein the cutting element is oriented in said support body so that a major crystalline axis of said cutting element is substantially centered on one surface of said support body;
    C. a coating on the surface of said cutting element substantially comprising a silicate glaze;
    D. a cushion layer substantially between said silicate layer and the support body comprising a ceramic clay; and
    E. an abrasion resistive layer on said support body comprised substantially of rhodium.

15. A scribe comprising the knife blade of claim 14 wherein at least four sides of the crystalline material has been ground to a substantially pointed tip on said crystalline material.

* * * * *